Patented Nov. 4, 1941

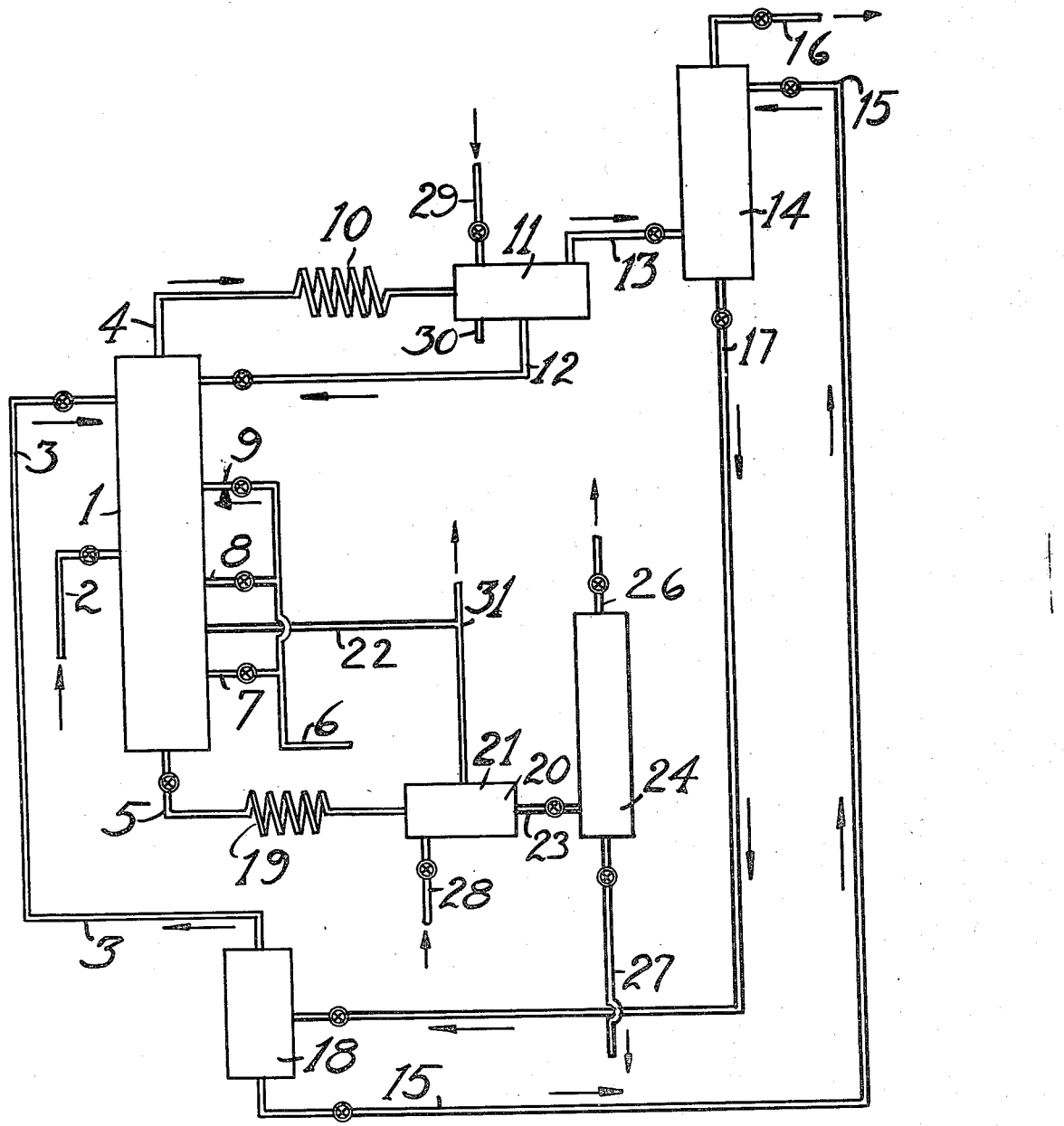

2,261,799

UNITED STATES PATENT OFFICE 2,261,799

REMOVING SOLVENTS FROM RAFFINATES

Joe L. Franklin, Jr., Goose Creek, Tex., assignor to Standard Oil Development Company, a corporation of Delaware Application November 30, 1939, Serial No. 306,829

4 Claims. (Cl. 196—13)

The present invention relates to the solvent treatment of mineral oils. The invention is particularly directed to the recovery of the primary selective solvent from the oil without the necessity of distillation. In accordance with the present invention the extracted oil is re-extracted with a secondary solvent which has a preferential selectivity for the primary solvent as compared to the mineral oil and which is further characterized by having a boiling point above the boiling point of the primary solvent.

It is well known in the art to treat petroleum oils with various selective solvents or solvent mixtures which have the ability to segregate the relatively more paraffinic constituents from the relatively more aromatic constituents. In these processes solvents of the class of solvents which have a preferential selectivity for the more aromatic type compounds are usually employed. Solvents of this class are, for example, phenol, furfural, nitro benzene, sulfur dioxide, cresol, aniline, beta beta dichlor diethyl ether, and the like. It is also known to employ other substances as, for example, substances of the class of liquefied normally gaseous hydrocarbons, in combination with the above described class of solvents. In these solvent treating processes the oil and the solvent are contacted by various means, as for example, by batch or by semi-batch operations. However, the usual method of treating the oil with the solvent is to contact the oil and solvent in a countercurrent treating tower process in which the heavier phase, usually the solvent, is introduced at the top of a countercurrent treating tower, while the lighter phase, usually the oil, is introduced at the center or at the bottom section of the tower. Efficient contact between the countercurrently flowing phases is secured by suitable distributing and contacting means such as contact masses, distributing plates, pierced plates and the like. Temperature and pressure conditions are maintained in the tower to secure the formation of a relatively solvent poor or raffinate phase highly paraffinic in nature and a solvent-rich or solvent extract phase highly aromatic in nature. The respective phases are segregated and removed from the tower. The solvent is then separated from the extract and raffinate by any suitable means, usually by distillation.

In these processes a large part of the costs of the operations is in the recovery of the selective solvents. As a result, many procedures have been suggested for recovering the selective solvent from the treated oil without the necessity of distillation. For instance, it has been suggested that the solvent extract phase be re-extracted with a secondary solvent which has a preferential selectivity for the oil as compared to the primary selective solvent. A process of this character is to treat petroleum oils with a phenolic type solvent and then to re-extract the resulting solvent extract phase with a narrow cut naphtha solvent boiling in the range from 300° F. to 500° F., and having a preferential selectivity for the extract oil as compared to the primary phenolic solvent. The secondary solvent is then usually removed from the extract by distillation. This type of operation possesses advantages over prior processes, since the latent heat of vaporization of the secondary solvent is less than the latent heat of vaporization of the primary solvent, as for example, phenol. Processes of this character, however, have not been entirely successful due to the fact that the very highly aromatic oil constituents are more soluble in the primary solvent than they are in the secondary solvent and are therefore not readily removed from the primary solvent. The result is that the highly aromatic oil constituents continually build up in the primary solvent necessitating frequent purification of the same. Furthermore these processes directed to the removal of the primary selective solvent from the solvent extract phase by means of a secondary solvent are not suitable for separating raffinate oil from the primary solvent in the primary raffinate phase.

I have now discovered a process by which it is possible to treat mineral oils with solvents of the class which have a preferential selectivity for the more aromatic type constituents as compared to the more paraffinic type constituents and to separate these solvents from the raffinate oil without having to distill the same. In accordance with my invention the valuable raffinate oil is recovered without distillation thus ensuring substantially no decomposition of the same by re-extracting the raffinate phase with a secondary solvent selected from a particular class of substances. My process utilizes a secondary solvent selected from the class of solvents which are characterized by being only slightly soluble in mineral oils and which have a preferential selectivity for the primary selective solvent as compared to the mineral oil. My class of secondary solvents is further characterized by having a higher internal pressure, and preferably a higher boiling point than the primary solvent. The process of my invention is particularly adapted for the processing of the highly paraffinic raffinate oils. In accordance with the present process decomposition and impairment of the quality of the highly paraffinic raffinate oil is avoided since no distillation of the oil occurs.

The process of my invention may be readily understood by reference to the attached drawing illustrating one modification of the same. For purposes of illustration the feed oil is taken to be a petroleum oil boiling in the lubricating oil range. The primary selective solvent is assumed to be phenol while the secondary solvent is taken to be glycerine. The feed oil is introduced into the lower or middle section of primary treating tower 1 by means of feed line 2. The feed oil flows upwardly through tower 1 and contacts downflowing phenol which is introduced into the upper part of tower 1 by means of solvent feed line 3. Temperature and pressure conditions are maintained in tower 1 adapted to secure the formation of a solvent-poor or raffinate phase and a solvent-rich or solvent extract phase. It is to be understood that tower 1 is provided with suitable distributing and contacting means such as contact masses, pierced plates, distributing plates and the like. The raffinate phase is withdrawn from tower 1 by means of line 4, while the solvent extract phase is withdrawn from the tower by means of line 5. Water, glycerine or an equivalent solvent modifying agent may be introduced into tower 1 at a plurality of stages by means of lines 6, 7, 8, and 9. The raffinate phase after removal from tower 1 by means of line 4 may be cooled in cooler 10 and then introduced into raffinate settler 11 in which phase separation occurs. The relatively solvent-rich phase may be returned to tower 1 by means of line 12 or withdrawn by means of line 30. The relatively solvent-poor raffinate-oil phase is withdrawn from raffinate settler 11 by means of line 13 and introduced into raffinate extraction tower 14. The highly paraffinic oil phase containing phenol dissolved therein flows upwardly through tower 14 and contacts downflowing glycerine which is introduced into tower 14 by means of line 15. The raffinate oil free of phenol and glycerine is withdrawn from raffinate extraction tower 14 by means of line 16, while the glycerine-phenol phase is withdrawn from tower 14 by means of line 17. The phenol-glycerine phase is introduced into still 18 and distilled under conditions to remove overhead the phenol, by means of line 3, which is condensed and recycled to primary tower 1. The undistilled glycerine is removed from still 18 by means of line 15 and recycled to raffinate extraction tower 14 by means of line 15.

Although the present invention is particularly directed and applicable to the removal of a primary selective solvent from the raffinate phase, it may be applied under certain conditions in the removal of the primary selective solvent from the solvent extract phase. If conditions should warrant the operation, the procedure employed is essentially the same as that used with respect to the raffinate phase, except that means must be provided for separating any added solvent modifying agent from the primary solvent and also from the secondary solvent if it be a different material than the latter. However, the removal of the primary solvent from the solvent extract phase in accordance with the present process is not a preferred procedure. I prefer to use other well known means of removing the solvent from the solvent extract phase. Thus, the solvent extract phase is withdrawn from countercurrent treating tower 1 by means of line 5, may be cooled in cooler 19, and then passed to solvent separator 20 in which a phase separation will occur. The relatively solvent-poor phase may be returned to tower 1 by means of line 22 or withdrawn from the system by means of line 31. If the solvent extract phase is not cooled, phase separation may be secured by the addition of a precipitating agent which is introduced into solvent separator 20 by means of line 28. The relatively solvent-rich phase is withdrawn from solvent separator 20 by means of line 23 and passed to solvent recovery unit 24. The solvent is removed by means of line 26, while the highly aromatic extract is removed by means of line 27 and handled in any manner desirable. It may be desirable to re-extract the raffinate phase with glycerine in raffinate extraction tower 14 after securing phase separation of the raffinate in raffinate separator 11 by introducing a small quantity of glycerine into the separator by means of line 29.

The process of the present invention may be widely varied. In general, the process is applicable in the treatment of any mineral oil. It is particularly adapted for the recovery of primary selective solvents from highly paraffinic raffinate phases in which said selective solvents are of the character which have a preferential selectivity for the more aromatic type compounds as compared to the more paraffinic type compounds.

The secondary solvent of my invention is selected from the class of solvents which are characterized by being only slightly soluble in highly paraffinic mineral oils and which will substantially completely dissolve the primary sovent in the presence of said mineral oils. The solvents of my invention, furthermore, preferably have boiling points higher than the boiling point of the primary selective solvent. My solvents are further characterized by having internal pressures in the range between about 7,000 and 14,000 atmospheres. Secondary solvents of this character are, for example, glycerine, ethylene glycol, diethylene glycol, formamide, formic acid, and methyl alcohol. Especially desirable solvents particularly adapted for the removal of phenolic type primary selective solvents from highly paraffinic oil phases are those solvents which have internal pressures in the range from 10,000 to 11,000 atmospheres. Solvents of this type are, for example, glycerine and formamide. Glycerine is particularly preferred. In general, when selecting the secondary solvent it is desirable to choose one whose boiling point is higher and whose internal pressure is at least 2,000 atmospheres greater than that of the primary solvent and at least 4,000 atmospheres greater than that of the hydrocarbon from which the primary solvent is to be selectively dissolved. Preferred solvents for removing phenolic type solvents from highly paraffinic raffinates are those which have internal pressures in the range below about 12,000 atmospheres and whose internal pressures are at least 6,000 atmospheres greater than the internal pressures of the hydrocarbons from which the phenolic type solvent is to be removed.

Solvent extraction processes involve physical actions instead of chemical reactions. Therefore, I prefer to classify solvents according to ranges of internal pressures, a physical property which is indicative of solvency power, rather than according to a generic chemical name which may have little significance. For example, at 20° C. the hydrocarbons have internal pressures in the vicinity of about 2,500 atmospheres for paraffins, 3,400 atmospheres for aromatics and 3,000 atmospheres for naphthenes, the value for the last being between that of the other two as would be expected. Solvents which have the ability to separate mineral oils into their relatively more aromatic and into their relatively more paraffinic constituents have internal pressures in a range higher than the range of the internal pressures of the aromatic hydrocarbons.

The more common solvents used in mineral oil extraction have internal pressures at 20° C. ranging between about 4,000 and 6,000 atmospheres. Solvents having internal pressures at 20° C. above approximately 6,500 atmospheres are not very satisfactory for extracting mineral oils to separate them into their more aromatic and more paraffinic constituents, because the solubility of hydrocarbons in said solvents is so low that excessive quantities of solvent are required to effect the desired results. It is well known that solvents are more selective at lower temperatures than at higher temperatures; the reason for this can be explained in the fact that the internal pressure increases with a decrease in temperature. I have found it convenient to classify liquids having internal pressures at 20° C. ranging between 4,000 and 6,000 atmospheres as primary solvents for the more aromatic type hydrocarbons and liquids having internal pressures at 20° C. greater than about 6,000 atmospheres as secondary solvents; i. e., as solvents suitable for extracting said primary solvents from solutions in hydrocarbons. The following table shows the internal pressures and normal boiling points of a few hydrocarbons and also of some primary and secondary solvents. It will be noted that water has an internal pressure at 20° C. of 24,250 atmospheres. Although this compound has been used as a secondary solvent in certain operations, its very high internal pressure makes it undesirable for the reason that the greater the difference between the internal pressures of two liquids at a given temperature, the less mutually soluble the two become at that temperature. Thus, for commercial operation a prohibitive amount of water would be needed to completely remove the primary selective solvent from the oil.

It is indirectly measured by such properties as surface tension, heat of vaporization, expansion and compressibility. While there are several methods of obtaining the internal pressure of a substance, I prefer to calculate it using the equation $I = 41.4\ LD$, where "I" is the internal pressure expressed in atmospheres, "L" is the energy of vaporization expressed in gram-calories per gram, and "D" is the absolute density expressed in grams per cubic centimeter. "Energy of vaporization" is equivalent to "latent heat of vaporization" minus the "energy consumed in expanding the substance against the external pressure," but the latter factor is, relatively, quite small and may be neglected. Consequently, for practical purposes "latent heat of vaporization" may be substituted for "energy of vaporization" in the above equation. Since latent heat of vaporization and density both change with a change in temperature, it is obvious that the internal pressure of a substance also changes with a change in its temperature, the value becoming greater as the temperature decreases. For convenience and for purpose of comparison, it is usually preferable to calculate the internal pressures at 20° C. for all substances because the specific gravities given in the literature are usually for that temperature. Since latent heats of vaporization are usually determined at temperatures approximating the boiling points of the various substances, and consequently have no common temperature basis, the Hildebrand rule may be employed in converting the available latent heat values to values having a common temperature basis.

Temperature and pressure conditions maintained on the primary extracting tower may vary widely. In general, the temperatures should be in the range between the melting point of the primary solvent and the temperature at which Table 1

| Substance | Boiling point, °C. | Absolute density at 20° C. | Latent heat of vaporization— | | | Internal pressure at 20° C., atms. |
|---|---|---|---|---|---|---|
| | | | From literature | | Calculated, gm.-cal./gm. at 20° C. | |
| | | | At °C. | Gm.-cal./gm. | | |
| Hydrocarbons: | | | | | | |
| Paraffins— | | | | | | |
| n-Pentane | 36.0 | 0.6263 | 70 | 84.3 | 87.3 | 2,265 |
| n-Hexane | 68.7 | 0.6595 | 68.9 | 81.9 | 89.7 | 2,442 |
| n-Heptane | 98.4 | 0.6837 | 97.2 | 76.4 | 86.6 | 2,450 |
| n-Octane | 125.6 | 0.7028 | 125.3 | 70.8 | 85.7 | 2,495 |
| n-Decane | 173.8 | 0.7301 | 159.9 | 60.1 | 82.0 | 2,476 |
| Aromatics— | | | | | | |
| Benzene | 80.1 | 0.8791 | 80.2 | 94.0 | 104 | 3,780 |
| Toluene | 110.6 | 0.866 | 109.7 | 86.5 | 100 | 3,590 |
| m-Xylene | 139.2 | 0.8641 | 138.3 | 81.9 | 96.2 | 3,440 |
| p-Cymene | 177.4 | 0.8570 | 176.5 | 67.6 | 87.8 | 3,110 |
| Naphthenes— | | | | | | |
| Cyclohexane | 80.8 | *0.7831 | 80 | 85.6 | 96.5 | 3,125 |
| Methylcyclohexane | 100.8 | 0.7693 | 99.9 | 76.9 | 89.4 | 2,840 |
| Decahydronaphthalene | 191.7 | 0.887 | 191.7 | 71.0 | 90.2 | 3,310 |
| Cyclohexene | 83.3 | 0.8112 | 81.6 | 88.7 | 100.8 | 3,390 |
| Turpentine | 160 | 0.868 | 156 | 68.5 | 81.5 | 2,925 |
| Primary solvents: | | | | | | |
| Phenol | 182 | 1.072 | 181.4 | 114.3 | 135 | 6,000 |
| Furfural | 161.7 | 1.1598 | 160.5 | 107.5 | 123 | 5,910 |
| Sulfur dioxide | −10.0 | 1.382 | −10.8 | 94.9 | 84 | 4,810 |
| Aniline | 184.4 | 1.0214 | 181 | 104.3 | 125 | 5,280 |
| BB' dichlordiethyl ether | 178 | 1.222 | 178 | 64.1 | 77 | 3,900 |
| Nitro benzene | 209.6 | 1.2032 | 210.6 | 79.2 | 98 | 4,150 |
| Secondary solvents: | | | | | | |
| Glycerine | 290 | 1.2611 | 290 | 158.4 | 194 | 10,100 |
| Ethylene glycol | 197.2 | 1.1131 | 197.4 | 194.5 | 229 | 10,580 |
| Diethylene glycol | 244.5 | 1.1177 | 244 | 150.0 | 175 | 8,100 |
| Formamide | 210.7 | 1.134 | 193 | 187.7 | 234 | 11,000 |
| Formic acid | 100.7 | 1.220 | 100.5 | 115.5 | 136 | 6,880 |
| Methyl alcohol | 64.7 | 0.7913 | 63.8 | 263.3 | 280 | 9,160 |
| Water | 100 | 0.9982 | 20 | 584.9 | 586 | 24,250 |

*At 15° C.

Internal pressure is the name given to the force of cohesion which, together with the external pressure, balances the thermal pressure.

complete miscibility occurs between the oil and the solvent or the oil and the solvent containing a modifying agent. The quantity of primary solvent used per volume of oil likewise will depend to a large extent upon the particular oil being treated, the solvent employed, as well as upon the yields and quality of products desired. In general, it is preferred to use from one-half to four volumes of primary solvent per volume of oil. The temperature and pressure conditions maintained on the secondary extracting tower likewise will depend upon the above named factors. When employing phenol and re-extracting the same with glycerine, it is preferred that a temperature in the range from 160° F. to 200° F. be employed.

In order to further illustrate the invention, the following examples are given which should not be construed as limiting the same in any manner whatsoever:

Example 1

A raffinate phase containing 12% by volume of phenol secured from the extraction of a lubricating oil with phenol was re-extracted with glycerine at 180° F. in a countercurrent process consisting of 3 stages. A ratio of glycerine to phenolic raffinate of 0.4:1.0 was employed. The following table summarizes the results of this operation:

Table 2

| | |
|---|---|
| Treating temperature °F | 180 |
| Number of stages (countercurrent) | 3 |
| Phenol content of raffinate charge per cent | 12 |
| Parts of phenolic raffinate charged | 100 |
| Parts of glycerine charged | 40 |
| Ratio of glycerine to phenolic raffinate | 0.4:1 |
| Parts of dephenolized raffinate recovered | 88.0 |
| Parts of glycerine plus phenol recovered | 52.1 |
| Phenol content of the dephenolized oil* | Trace |

*Determined by washing the oil with water and brominating the phenol dissolved therein.

Table 3

| Tests on dephenolized raffinate | Dephenolized by extraction with glycerine | Dephenolized by exhaustive washing with water and subsequently drying by blowing with natural gas |
|---|---|---|
| Gravity, ° A. P. I. | 26.9 | 26.8 |
| Flash, °F | | 385 |
| Viscosity at 100 °F. (SUS) | | 303 |
| Viscosity at 210 ° F. (SUS) | | 49.9 |
| Viscosity index | | 71 |
| Neutralization value | 0.07 | 0.07 |

Both the bromine test for phenol and the neutralization value show that phenol is readily separated from raffinate oil by extraction with glycerine. Furthermore, comparison of the A. P. I. gravities of the two dephenolized raffinates shows that substantially no glycerine was dissolved in the highly paraffinic raffinate oil. Since the glycerine and phenol content of the dephenolized raffinate was small and since the quantity of dephenolized raffinate recovered was substantially equal to the quantity of oil charged, it follows that the quantity of oil dissolved in the glycerine layer was negligible. This is further borne out by the fact that the solubility of glycerine in mineral oil and of mineral oil in glycerine is so small as to be very difficult to measure but is estimated to be less than about 0.1%. This is likewise true of the low boiling hydrocarbons, such as benzol, in which glycerine shows very slight solubility.

In view of the above results, it is evident that phenol can be successfully separated from a paraffinic raffinate oil by extraction with glycerine.

Example 2

The suitability of glycerine as a secondary solvent for the removal of primary solvents, particularly from petroleum, may be readily seen by the following data:

| | |
|---|---|
| Boiling point | 554° F. |
| Specific gravity | 1.26 |
| Miscibility with phenol | In all proportions at 120° F. |
| Solubility in raffinate from a Coastal crude | Less than 0.2% at 180° F. |

A raffinate secured from a Coastal crude and containing 20% phenol was contacted with an equal volume of glycerine at 180° F. Under these conditions, approximately 90% of the phenol was removed indicating a 9 to 1 distribution ratio of phenol between glycerine and oil. This data indicates that phenol will be efficiently removed by countercurrent extraction with a relatively smaller amount, that is with 30% to 40% of glycerine.

Example 3

100 volumes of a mixture containing 90 volumes of Coastal lube raffinate and 10 volumes of phenol were batch extracted with formamide at 90° F., using three successive 50% treats. The dephenolized oil had a Saybolt Universal viscosity of 100 seconds at 100° F. and contained only 0.0005 per cent phenol by weight. Since the solubility of formamide in oil is in the range of about 0.01%, it may be seen that formamide is a desirable secondary solvent for removing phenol from a raffinate oil.

Example 4

100 volumes of a mixture containing 90 volumes of the Coastal lube raffinate employed in Example 3 and 10 volumes of phenol were batch extracted with ethylene glycol, using three successive 50% treats at 90° F. The dephenolized oil contained only 0.0006 per cent phenol by weight. Since the solubility of ethylene glycol in oil is negligible, it is evident that ethylene glycol is a satisfactory secondary solvent for extracting phenol from raffinate oil.

Example 5

100 volumes of a mixture containing 90 volumes of Coastal lube raffinate employed in Example 3 and 10 volumes of furfural were batch extracted with formamide, using three successive 50% treats at 90° F. The desolventized oil contained 0.032% furfural by weight.

Example 6

100 volumes of a mixture containing 98 volumes of a kerosene raffinate and 2 volumes of sulfur dioxide were extracted with methyl alcohol, using three 50% treats at a temperature range from 0° F. to −10° F. The recovered kerosene contained 0.094% sulfur dioxide by weight.

The process of the present invention is not to be limited in any manner whatsoever, but only in and by the following claims in which it is desired to claim all novelty in so far as the prior art permits.

I claim:

1. Process for the removal of primary selective solvents from raffinate oils secured in the solvent treatment of petroleum oils, said primary solvents being of the class of solvents which has the ability to selectively dissolve the more aromatic constituents as compared to the relatively more paraffinic constituents comprising treating said raffinate oils containing said primary solvent with formamide under conditions to form a substantially solvent-free raffinate oil phase and a primary solvent formamide phase, removing the oil phase and separating the primary solvent from the formamide.

2. Process in accordance with claim 1 in which said primary solvent is phenol.

3. Solvent treating process comprising contacting a petroleum oil with a selective solvent having the ability to selectively dissolve the more aromatic fractions as compared with the more paraffinic fractions under conditions to form a raffinate phase and a solvent extract phase, separating the respective phases and removing the primary selective solvent from the raffinate phase by treating said phase with formamide under conditions to form a substantially solvent-free raffinate oil phase and a primary solvent formamide phase, removing the oil phase and separating the primary solvent from the formamide.

4. Process in accordance with claim 3 in which said primary solvent is phenol.

JOE L. FRANKLIN, Jr.